United States Patent
Felsenstein et al.

(10) Patent No.: US 6,421,617 B2
(45) Date of Patent: Jul. 16, 2002

(54) INTERFACE INCLUDING FLUID FLOW MEASUREMENT FOR USE IN DETERMINING AN INTENTION OF, OR AN EFFECT PRODUCED BY, AN ANIMATE OBJECT

(75) Inventors: Lee Felsenstein, Palo Alto; Robert S. Shaw, Santa Cruz; Elaine Brechin, San Francisco, all of CA (US)

(73) Assignee: Interval Research Corporation, Palo Alto, CA (US)

( * ) Notice: Subject to any disclaimer, the term of this patent is extended or adjusted under 35 U.S.C. 154(b) by 0 days.

(21) Appl. No.: 09/118,040

(22) Filed: Jul. 18, 1998

(51) Int. Cl.$^7$ ............................................. G01F 15/00
(52) U.S. Cl. ..................... 702/50; 702/45; 73/861.03; 73/861.85
(58) Field of Search ............................ 702/50, 19, 31, 702/32, 45–49, 52, 53, 55, 99, 100, 127, 130, 131, 133–136, 183, FOR 103, FOR 104, FOR 115, FOR 119, FOR 127, FOR 128, FOR 134, FOR 142, FOR 158, FOR 170, FOR 171; 374/141, 142, 159, 174, 178, 180–182; 340/632, 606, 608, 609, 610, 573.1; 700/281, 282, 299, 300; 422/83–85, 91, 98, 105, 107–109, 119; 128/204.23, 204.26, 203.23, 203.24, 200.14, 204.21, 204.18; 73/1.34, 1.35, 1.16, 1.29, 861.85, 201.11, 204.14, 204.15, 204.18, 204.19, 204.24, 861, 861.01–861.03, 202.5; 377/21, 25

(56) References Cited

U.S. PATENT DOCUMENTS

| | | | | |
|---|---|---|---|---|
| 5,161,541 A | * | 11/1992 | Bowman et al. | 600/537 |
| 5,347,843 A | * | 9/1994 | Orr et al. | 73/1.34 |
| 5,518,002 A | * | 5/1996 | Wolf et al. | 600/538 |
| 5,582,182 A | * | 12/1996 | Hillsman | 600/529 |
| 5,710,380 A | * | 1/1998 | Talley et al. | 73/861.85 |
| 5,765,563 A | * | 6/1998 | Vander Schaaf | 600/537 |
| 5,800,360 A | * | 9/1998 | Kisner et al. | 600/532 |
| 5,901,704 A | * | 5/1999 | Estes et al. | 128/204.23 |
| 6,158,432 A | * | 12/2000 | Biondi et al. | 128/204.21 |
| 6,183,423 B1 | * | 2/2001 | Gaumond et al. | 600/529 |

FOREIGN PATENT DOCUMENTS

EP 0651971 A1 * 10/1995 ............ 128/204.23

* cited by examiner

*Primary Examiner*—Hal Wachsman
(74) *Attorney, Agent, or Firm*—VanPelt & Yi LLP

(57) ABSTRACT

Fluid flow can be measured using a multiplicity of sensors in a manner that enables acquisition of detailed information regarding the fluid flow. In particular, the invention can advantageously be used in situations in which the measured fluid flow is anticipated to be turbulent. Even more particularly, the invention can be advantageously be used to obtain measurements of fluid flow in the vicinity of an animate object (e.g., human) which can be used, together with knowledge of the characteristics of the animate object and, if relevant, of one or more objects in the vicinity of the animate object, to determine an intention of, or an effect produced by, the animate object. The invention can be used by people in interacting with a large variety of devices to effect control of those devices.

20 Claims, 5 Drawing Sheets

US 6,421,617 B2

INTERFACE INCLUDING FLUID FLOW MEASUREMENT FOR USE IN DETERMINING AN INTENTION OF, OR AN EFFECT PRODUCED BY, AN ANIMATE OBJECT

BACKGROUND OF THE INVENTION

1. Field of the Invention

This invention relates to measuring fluid flow. In particular, the invention relates to measuring fluid flow using a multiplicity of sensors and, more particularly, to such measurement of fluid flow in situations in which the fluid flow is anticipated to be turbulent. This invention is also related to measuring fluid flow in the vicinity of an animate object and using such measurement, together with knowledge of the characteristics of the animate object and, if relevant, of one or more objects in the vicinity of the animate object to determine an intention of, or an effect produced by, the animate object.

2. Related Art

Previously, fluid flow has been measured using devices such as an anemometer. An anemometer typically uses one or a few (e.g., four or less) sensors to measure the temperature of a fluid, from which a description of one of a limited number of characteristics of the fluid flow (e.g., velocity) is determined. Typically, anemometers are used to measure laminar flows, since the orderliness of such flows enables sufficiently accurate measurements to be obtained with the small number of sensors characteristic of an anemometer.

Fluid flow measurement has previously been used to determine the characteristics of a fluid flow in the vicinity of an inanimate object, such as the wing of an airplane or the chassis of an automobile. In many cases, such fluid flows are laminar. Fluid flow in the vicinity of an animate object (e.g., a human) can often be turbulent as a result of motion of an unaerodynamic body part (e.g., the hand) or breathing. Anemometers and other existing flow measurement devices may not be adequate to provide sufficiently detailed information regarding turbulent flows. Additionally, analysis of fluid flow in the vicinity of an animate object has not been used to discern an intention of, or an effect produced by, the animate object.

SUMMARY OF THE INVENTION

The invention enables fluid flow measurements to be obtained in the vicinity of an animate object (e.g., human) and used, together with knowledge of the characteristics of the animate object and, if relevant, of one or more objects in the vicinity of the animate object, to determine an intention of, or an effect produced by, the animate object. Fluid flow can be measured using an apparatus including a multiplicity of data sensors arranged in a manner that enables acquisition of detailed information regarding the fluid flow. In particular, the fluid flow measuring apparatus can advantageously be used in situations in which the measured fluid flow is anticipated to be turbulent, which is typically the case when measuring the fluid flow in the vicinity of an animate object.

In one embodiment, the invention provides an interface controlled by an animate object by measuring fluid flow in the vicinity of the animate object and determining an intention of, or an effect produced by, the animate object, based upon the measured fluid flow and knowledge of one or more characteristics of the animate object. The fluid flow measurement apparatus can be attached to the animate object. For example, the fluid flow measurement apparatus can be attached in the vicinity of the mouth of the animate object. By measuring fluid flow in the vicinity of the mouth of an animate object, breathing can be measured. Breath measurement, as described more fully below, can be used as a control mechanism. The fluid flow measurement apparatus can also be attached in the vicinity of a movable part of the animate object. By measuring fluid flow in the vicinity of a movable part of an animate object, motion of that part of the animate object can be measured. Such motion can, for example, be interpreted as gestures and used to effect corresponding control.

Any appropriate fluid flow measuring apparatus can be used. For example, the fluid flow measuring apparatus can be an apparatus adapted to sense temperature. (Temperature sensors can be desirable because they are often relatively inexpensive.) Such a fluid flow measuring apparatus could be implemented using one or more semiconductor devices. In particular, such sensor(s) can be implemented using a junction diode. A fluid flow measuring apparatus adapted to sense temperature could also be implemented using one or more thermocouples, or one or more thermistors. A fluid flow measuring apparatus for use with the invention can be implemented with other types of devices as well. For example, the fluid flow measuring apparatus can be an apparatus adapted to sense mechanical deflections, such as devices that include a piezoelectric transducer or devices that include a strain gauge.

It is anticipated that in many applications for which the invention will be used, the measured flow will be turbulent. It is, therefore, desirable that the fluid flow measurement apparatus include a relatively large number of sensors, since the acquisition of a large amount of data regarding the fluid flow may be necessary—and is, at least, desirable—to ensure that the fluid flow is measured with adequate accuracy and comprehensiveness. Acquisition of a large amount of data can also enable more complex analysis of the data. Thus, a fluid flow measuring apparatus in accordance with the invention preferably uses more sensors than have been used in anemometers or other previous fluid flow measuring apparatus. In one embodiment of the invention, a fluid flow measuring apparatus according to the invention includes 5 or more sensors. Further, the sensors of a fluid flow measuring apparatus for use with the invention can advantageously be arranged in an array of two or more dimensions, thus enabling measurement of fluid flow in a corresponding number of dimensions.

In another embodiment, the invention measures fluid flow by measuring the voltage across the semiconductor junction of each of one or more data sensors, determining the temperature of the one or more data sensors based upon the voltage across the semiconductor junction of the data sensor, and determining a description of one or more characteristics of the fluid flow using one or more data sensor temperatures. The data sensor(s) can be, for example, junction diode(s). The data sensors can be arranged in an array of two or more dimensions. In a particular implementation of this embodiment of the invention, five or more data sensors are used.

DETAILED DESCRIPTION OF THE INVENTION

Figure 1:
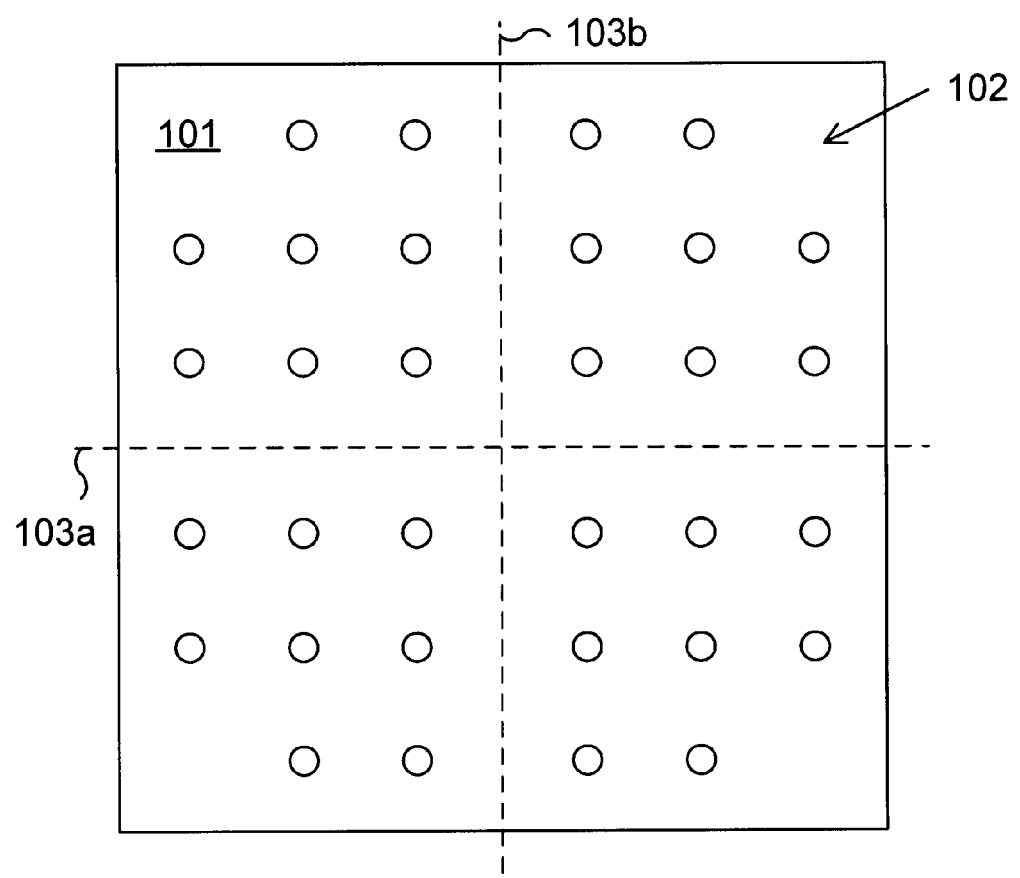
FIG. 1 illustrates, in simplified form, an array of sensors of a fluid flow measuring apparatus according to the invention.

According to one aspect of the invention, fluid flow can be measured using an apparatus including a multiplicity of data sensors arranged in a manner that enables acquisition of detailed information regarding the fluid flow. (As used herein, a "data sensor" is a sensor that is used to sense data, i.e., a value of a characteristic, such as temperature magnitude, regarding the fluid flow being measured that can then be used to describe, for example, the velocity, acceleration and/or direction of the fluid flow. The value sensed by a data sensor may be compared to a value sensed by a "reference sensor" to produce the data from that data sensor, as is the case in a particular embodiment of a fluid flow measuring apparatus according to the invention described below.) In particular, the invention can advantageously be used in situations in which the measured fluid flow is anticipated to be turbulent, such as measurement of fluid flow in the vicinity of an animate object (e.g., human).

According to another aspect of the invention, measurements of fluid flow (which can be obtained in the manner described above) in the vicinity of an animate object can be used, together with knowledge of the characteristics of the animate object and, if relevant, of one or more objects in the vicinity of the animate object, to determine an intention of, or an effect produced by, the animate object. Examples of such use of fluid flow measurements are described in more detail below (see, e.g., FIG. 5 and accompanying description).

In general, the invention enables fluid flow measurement in any number of dimensions. If fluid flow is to be measured in one direction, then at least 2 non-coincident data sensors must be used. If fluid flow is to be measured in two directions, then at least 3 non-collinear data sensors must be used. If fluid flow is to be measured in three directions, then at least 4 non-collinear data sensors must be used. It is anticipated the invention will often be used to measure fluid flow in two or more dimensions.

In accordance with one aspect of the invention, the fluid flow in the vicinity of an animate object is measured. As discussed above, fluid flow in the vicinity of an animate object is often turbulent. When measuring turbulent. fluid flow, it is generally desirable to use as many sensors as possible in order to increase the accuracy of the information obtained regarding the flow, more sensors enabling the measurement fluctuations that are associated with turbulent flow to be smoothed out as a result of averaging an increased number of data samples. Increasing the number of sensors can also increase the detail of the information obtained about the fluid flow. Additionally, increasing the number of sensors used may also enable more complex analysis of the acquired data. Thus, a fluid flow measuring apparatus in accordance with the invention preferably uses more sensors than have been used in anemometers or other previous fluid flow measuring apparatus. In one embodiment of the invention, a fluid flow measuring apparatus according to the invention includes 5 or more sensors. In a more particular embodiment (described in more detail below with respect to FIG. 1), a fluid flow measuring apparatus according to the invention includes 32 sensors.

However, as the number of sensors is increased, the measurement apparatus including the sensors generally becomes more complex and costly. Increasing the number of sensors may also necessitate construction of a measurement apparatus that undesirably influences the fluid flow being measured. Increasing the number of sensors also increases the computational cost (e.g., processing time) associated with processing and analyzing the acquired data. The particular number of sensors used for a particular measurement apparatus or application can be chosen in view of the above considerations.

FIG. 1 illustrates, in simplified form, an array of sensors (indicated generally by the numeral 102) of a fluid flow measuring apparatus according to the invention. It is to be understood that the particular array of sensors shown in FIG. 1 is merely illustrative, and that many other arrangements of sensors, including a different number and geometric arrangement of sensors, can be used in a fluid flow measuring apparatus according to the invention. In FIG. 1, there are thirty-two sensors 102 arranged in a square, six by six array, with no sensors located at the corners of the array. (The use of thirty two sensors—or some other multiple of eight sensors can be convenient because that number of sensors corresponds to the number of bits in a unit of data that is commonly used in computer processing, as known by those skilled in the art.) The sensors 102 can be conceptually divided into quadrants, as defined by the axes 103a and 103b, to facilitate acquisition and processing of the data as described further below.

The sensors in a fluid flow measuring apparatus according to the invention can be embodied by any appropriate, devices. For example, the sensors can be embodied by temperature sensing devices such as thermistors, thermocouples or junction diodes. Temperature sensors can be advantageous because they are typically relatively low in cost. In particular, junction diodes can be advantageous because they exhibit a linear relationship between voltage and temperature, as discussed further below. (Other sensors may involve more complex relationships, necessitating additional data processing.) Sensed temperature can be used to determine fluid flow characteristics, such as fluid velocity and acceleration, since the passage of a fluid over a temperature sensor will lower the temperature sensed by the sensor in accordance with those characteristics (e.g., as the velocity of a fluid increases, the amount of heat carried away by the fluid increases, thereby decreasing the sensed temperature).

Other types of sensors can also be used, such as piezoelectric sensors and strain gauges, which sense mechanical deflection. The sensed mechanical deflection can be used to determine the force being applied to the sensor, which can, in turn, be used to determine characteristics of the fluid flow, using techniques known to those skilled in the art.

The sensors 102 are mounted on a sensor support 101. In general, a sensor support for use with the invention can be any appropriate structure.

A sensor support for use with the invention should be constructed so as to minimize interference with the measured fluid flow. This can be accomplished, for example, by constructing the entire sensor support with an aerodynamic shape that produces little effect on the fluid flow. This can also be accomplished by attaching the sensors with a structure (e.g., a thin wire) that produces little influence on the fluid flow, such that the sensors are positioned at a distance from other, less aerodynamically benign parts of the sensor support adequate to minimize or eliminate the influence of those parts of the sensor support on the fluid flow.

It may also be necessary to construct the sensor support so that a reference sensor is provided sufficiently proximate to the data sensors to produce accurate measurement of the ambient conditions (e.g., when the sensors are thermal sensors, the ambient temperature), yet insulated from influences from the fluid flow (e.g., when the sensors are thermal sensors, thermally insulated from temperature effects produced by the fluid flow). Such thermal insulation can be provided by positioning the reference sensor away from the data sensors and/or enclosing the reference sensor in a thermally insulative material.

For example, as shown in FIG. 1, the sensor support 101 can be a plate or platform to which the sensors 102 are attached with thin wires. The wires enable electrical signals to be transmitted from the sensors 102 to other electronic circuitry and/or electronic devices (which can be formed in or on the sensor support 101) that process the data obtained by the sensors 102 as described elsewhere herein. The thin wires can be made of a material with sufficient strength, in view of the construction (e.g., weight) of the sensors 102 and the expected fluid flow conditions (e.g., fluid velocity), to maintain the sensors in substantially fixed position within the fluid flow. The thin wires can also be made sufficiently thin to produce an acceptably small influence on the fluid flow. A reference sensor can be attached to the plate or platform, so that the reference sensor does not experience the fluid flow (and, in particular, the temperature effects associated therewith) sensed by the data sensors. The reference sensor may also, perhaps, be enclosed by a material that is sufficiently thermally insulative to allow the reference sensor to sense the ambient temperature (after a reasonable period of time), yet minimize or eliminate changes in temperature as a result of the fluid flow being measured.

Figure 2:
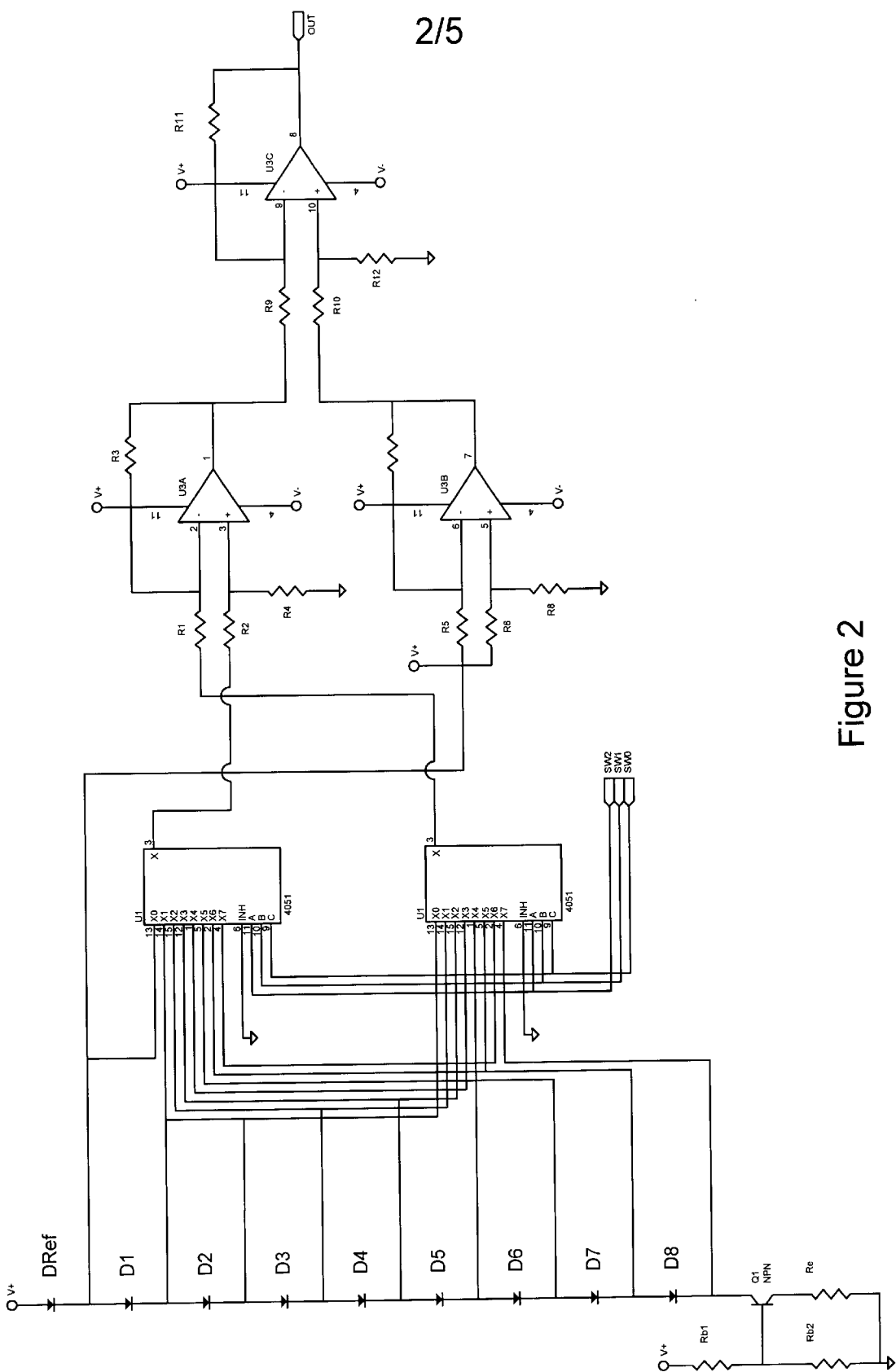
FIG. 2 is a schematic diagram illustrating a fluid flow measuring apparatus in accordance with the invention.

FIG. 2 is a schematic diagram illustrating a fluid flow measuring apparatus in accordance with the invention. Nine semiconductor junction diodes (eight "data" diodes, $D_1$–$D_8$, and one "reference" diode, $D_{ref}$) are connected in series in forward conduction mode between a supply voltage (indicated by $V^+$ in FIG. 2) and the collector of an NPN transistor $Q_1$. (The data diodes $D_1$–$D_8$ correspond to, for example, the eight sensors in one of the quadrants of the sensor array shown in FIG. 1.) The base of the transistor $Q_1$ is connected to the tap of a resistive voltage divider consisting of the resistors $R_{b1}$ and $R_{b2}$. The voltage divider ensures that the voltage at the base of the transistor $Q_1$ remains substantially constant. The emitter of the transistor $Q_1$ is connected to a ground voltage (indicated by an arrow in FIG. 3) through the resistor $R_e$.

Since the voltage at the emitter of the transistor $Q_1$ follows the voltage at the base of the transistor $Q_1$ less the substantially constant base-emitter voltage, the current through the emitter is constant and substantially equal to the current through the collector, regardless of the voltage at the collector (provided that the collector voltage is adequate to keep the transistor $Q_1$ out of the saturation condition). Thus, the transistor $Q_1$ serves as a regulator maintaining a constant current through the diodes $D_1$–$D_8$ and, $D_{ref}$.

The impedance values of the resistors $R_{b1}$, $R_{b2}$ and $R_e$ are chosen, as known by those skilled in the art, to produce a current adequate to cause self-heating of the diodes $D_1$–$D_8$ and $D_{ref}$. Illustratively, for a SOT-23 packaged diode, this current is about 100 milliamps. To produce such a current, the impedance values of the resistors $R_{b1}$, $R_{b2}$ and $R_e$ can be 10 kohms, 1.8 kohms and 100 ohms, respectively. Additionally, for that amount of current, the voltage drop across each of the diodes $D_1$–$D_8$ and $D_{ref}$ will be about 1 volt. The supply voltage $V^+$ must be large enough to ensure that, with such a voltage drop across the diodes $D_1$–$D_8$ and $D_{ref}$, the collector voltage is of the transistor $Q_1$ is large enough to keep the transistor $Q_1$ out of the saturation condition. In view of the foregoing, illustratively, a positive 12 volt supply voltage can be used.

The relationship between the current through, I, and the voltage across, V, a diode is given by the following equation:

$$I=I_0*\exp[(q*V)/(K*T)-1] \tag{1}$$

where q, K and $I_0$ are constants, and T is the temperature of the junction in degrees Kelvin. If the current through the diode, I, is held constant, it can be seen that the voltage across the diode, V, must vary linearly with the temperature across the diode, T. Thus, by maintaining a constant current through the diodes $D_1$–$D_8$ and $D_{ref}$, it is possible to measure the temperature of diodes $D_1$–$D_8$ and $D_{ref}$ (i.e., the temperature at the location of the diodes $D_1$–$D_8$ and $D_{ref}$) by sensing the voltage across the diodes $D_1$–$D_8$ and $D_{ref}$. As explained in more detail elsewhere herein, the temperature at the location of the diodes $D_1$–$D_8$ and $D_{ref}$) can be used to ascertain the fluid flow conditions (e.g., velocity, acceleration, direction) at those locations.

The reference diode $D_{ref}$ is mounted on the sensor support so that the reference diode $D_{ref}$ is thermally insulated and maintained at a constant temperature, i.e. so that the voltage across the reference diode $D_{ref}$ is affected only by ambient temperature and not by fluid flow.

The data inputs $X_0$–$X_7$ of two 8-to-1 analog selector circuits $U_1$ and $U_2$ are connected to the data diodes $D_1$–$D_8$ to enable sampling of the voltages across the data diodes $D_1$–$D_8$. Specifically, the data inputs of the analog selector circuit $U_1$ are connected to the anodes of the data diodes $D_1$–$D_8$ and the inputs of the analog selector circuit $U_2$ are connected to the cathodes of the data diodes $D_1$–$D_8$. The analog selector circuits $U_1$ and $U_2$ can be embodied by, for example, a CMOS-type 4051 selector circuit. A processing device (e.g., microprocessor), under control of an appropriate computer program, sequentially applies appropriate signals to the selection inputs $SW_0$, $SW_1$ and $SW_2$ to cause the analog selector circuits $U_1$ and $U_2$ to sample the anode and cathode voltages across particular data diodes $D_1$–$D_8$.

The data outputs X of the analog selector circuits $U_1$ and $U_2$ are connected to the inputs of an operational amplifier $U_{3A}$, which compares the outputs X to determine the difference between the anode and cathode voltages of a particular one of the data diodes $D_1$–$D_8$ (such difference being referred to herein as an "uncorrected data diode voltage"), amplifies the uncorrected data diode voltage and outputs an amplified uncorrected data diode voltage. The ratio of the impedance of the resistor $R_3$ to the impedance of the resistor $R_1$ (which is equal to the ratio of the impedance of the resistor $R_4$ to the impedance of the resistor $R_2$) is equal to the amplification factor of the operational amplifier $U_{3A}$.

The voltages at the anode and cathode of the reference diode $D_{ref}$ are connected to the inputs of an operational amplifier $U_{3B}$, which compares the voltages to determine the difference between the anode and cathode voltages of the reference diode $D_{ref}$ (such difference being referred to herein as an "uncorrected reference diode voltage"), amplifies the uncorrected reference diode voltage and outputs an amplified uncorrected reference diode voltage. The ratio of the impedance of the resistor $R_7$ to the impedance of the resistor $R_5$ (which is equal to the ratio of the impedance of the resistor $R_8$ to the impedance of the resistor $R_6$) is equal to the amplification factor of the operational amplifier $U_{3B}$.

The amplification factors of the operational amplifiers $U_{3A}$ and $U_{3B}$ are made equal and are chosen to have a magnitude, in view of the characteristics of the diodes $D_1-D_8$ and $D_{ref}$, that will provide output signal levels adequate to overcome signals generated by noise. Illustratively, an amplification factor of about 5 is adequate to accomplish this purpose.

The amplified uncorrected data diode voltage from the operational amplifier $U_{3A}$ and the amplified uncorrected reference diode voltage $U_{3B}$ are connected to the inputs of an operational amplifier $U_{3C}$. The operational amplifier $U_{3C}$ outputs a voltage which represents the difference between the amplified uncorrected data diode voltage and the amplified uncorrected reference diode voltage, further amplified by the amplification factor of the operational amplifier $U_{3C}$. The ratio of the impedance of the resistor $R_{11}$ to the impedance of the resistor $R_9$ (which is equal to the ratio of the impedance of the resistor $R_{12}$ to the impedance of the resistor $R_{10}$) is equal to the amplification factor of the operational amplifier $U_{3C}$. The amplification factor of the operational amplifier $U_{3C}$ is chosen to have a magnitude, in view of the amplification of the operational amplifiers $U_{3A}$ and $U_{3B}$, that will amplify the smallest expected differences between the amplified uncorrected data diode voltage and the amplified uncorrected reference diode voltage to a magnitude that is slightly more than the magnitude of the smallest voltage detectable by the A/D converter (discussed below) used with the fluid flow measuring apparatus.

For example, for an 8-bit A/D converter capable of sensing 256 different voltage levels and operating with a full-scale voltage of 5 volts, the smallest detectable voltage change is 0.0196 volts. Assuming a minimum diode voltage change of 0.5 mV and an amplification factor of 5 for the operational amplifiers $U_{3A}$ and $U_{3B}$, the change in the amplified diode voltage will be 2.5 mV. In view of the foregoing, the amplification factor of the operation amplifier $U_{3C}$ should be about 8 to ensure a voltage greater than 0.0196 volts.

The voltage output by the operational amplifier $U_{3C}$ is referred to as the "corrected data diode voltage" or, more simply, as the "data diode voltage." Since the data diode voltage represents the (amplified) difference between the voltage across the reference diode $D_{ref}$ and the voltage across a selected one of the data diodes $D_1-D_8$, the magnitude of the data diode voltage will not be affected by any change in temperature that affects both the reference diode $D_{ref}$ and the selected one of the data diodes $D_1-D_8$. In other words, the effect of the operational amplifier $U_{3C}$ (and the reason for providing the reference diode $D_{ref}$) is to eliminate the effects of the magnitude of the ambient temperature on the fluid flow measurements. Thus, the magnitude of the data diode voltage represents only changes in temperature at the location of the selected one of the data diodes $D_1-D_8$ resultant from the characteristics of the fluid flow at that location (excepting a DC component and a noise component in the data diode voltage, which can be eliminated from the data diode voltage as described further below).

The data diode voltage output from the operational amplifier $U_{3C}$ is input to a conventional A/D converter, which produces a digital signal that can be used by the processing devices (described below) that further process and analyze the acquired data. The A/D converter can be a separate device or can be implemented as part of a processing device used to implement the control processor 301 (described below with respect to FIG. 3). (The Motorola 68HC11 and 68HC12 processors, discussed below, that can be used to implement the control processor 301 include an internal A/D converter with 8 separate data inputs, selectable under control of appropriate software.)

In general, sensors of a fluid flow measuring apparatus according to the invention can be sampled in any desired order. It may even be desirable in some cases to sample fewer than all of the available sensors (for example, if immediately previous data indicates the fluid flow in the vicinity of one or more particular sensors is not changing significantly over time), thus reducing the computational cost associated with the processing and analysis of the data obtained by those sensors. It is anticipated, however, that in many cases the acquired data will be obtained by repetitively cycling through all of the sensors in a specified order. Sets of temporally proximate sensor data (e.g., a series of samples from all of the sensors) can be analyzed together (as described further below) to produce a description of the fluid flow at the time the data was acquired.

Figure 3:
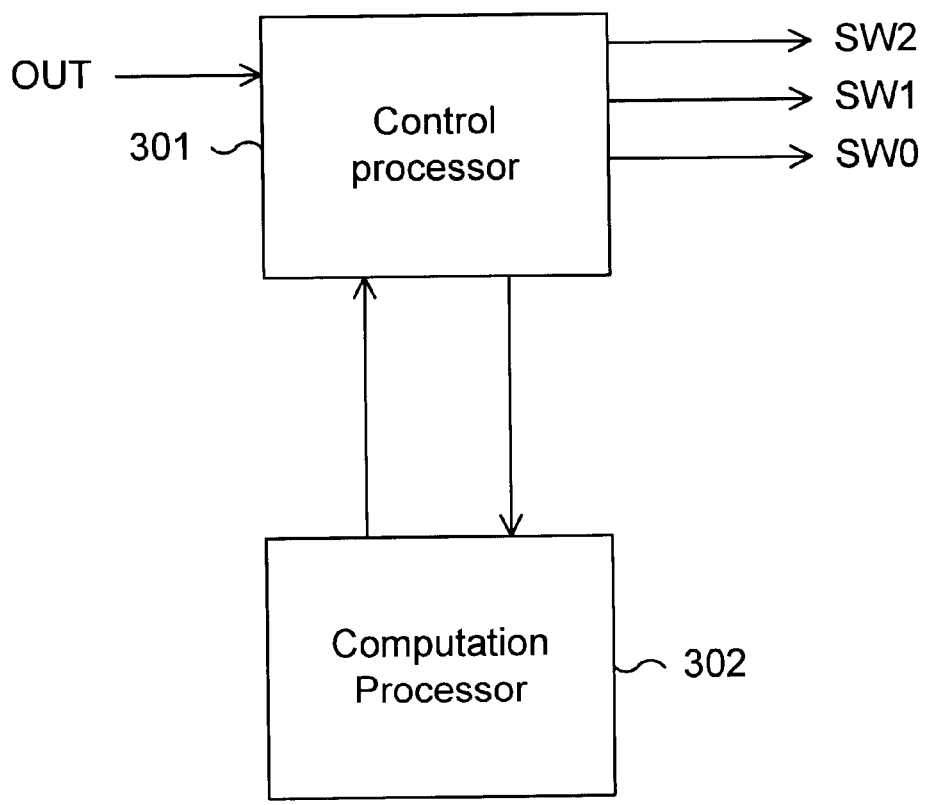
FIG. 3 illustrates the processing of the data obtained by the sensors of a fluid flow measuring apparatus in accordance with the invention.

FIG. 3 illustrates devices for further processing of the data acquired by a fluid flow measuring apparatus in accordance with the invention. A computation processor 302 processes and analyzes the acquired data, as explained in more detail below. A control processor 301 mediates interaction among the fluid flow measuring apparatus (e.g., the fluid flow measuring apparatus shown in FIG. 2), the computation processor 302 and a device for making use of the analyzed data, as also described below.

The control processor 301 can be, for example, a general purpose processing device operated in accordance with one or more computer programs including instructions that perform the desired functions. The control processor 301 transmits the selection inputs $SW_0$, $SW_1$, $SW_2$ to the fluid flow measuring apparatus (e.g., the analog selector circuits $U_1$ and $U_2$ of FIG. 2) to specify acquisition of data by particular sensors of the apparatus. The acquired data is received by the control processor 301 via the "Out" transmission line, converted to digital form if such conversion has not already taken place, and transmitted to the computation processor 302 for processing and analysis. It can be desirable to implement the control processor 301 with a device that accepts multiple analog inputs so that multiple acquired data (e.g., data from a sensor in each quadrant of the array shown in FIG. 1) can be received by the control processor 301 at one time. The Motorola 68HC11 and 68HC12 processors have this capability (as discussed above) and can be used with the invention. The control processor 301 can also desirably contain adequate memory for storage of the one or more computer programs that effect the control processor's 301 operation. The control processor 301 must also include I/O ports adequate for communication of data to and from the computation processor 302. These I/O ports can be serial (e.g., RS-232, RS-423 or RS-422) or parallel.

The computation processor 302 processes and analyzes the acquired data in accordance with one or more computer programs including instructions for accomplishing the desired functions. (The computer program(s) can be implemented as firmware or as software that operates a general purpose processing device.) The computation processor 302 may process the acquired data as necessary or desirable to enable or enhance use of the acquired data. Additionally, the acquired data is processed to produce a description of the fluid flow in the region in which the sensors of the fluid flow measuring apparatus are located. Further, in accordance with the invention, the data is analyzed by the computation processor 302, in a manner appropriate for the particular application of the invention, to make one or more determinations regarding the intention(s) of, or effect(s) produced by, an animate object (e.g., human) in the vicinity of which the fluid flow has been measured. As will be better appreciated from the description below, there are many ways in which the fluid flow data can be analyzed to make such determination(s). Some examples are discussed below.

It may be necessary or desirable to process the acquired data to remove noise and/or other extraneous components of the acquired data. For example, in a fluid flow measuring apparatus as described with respect to FIG. 2, the acquired data can include noise plus a D.C. component that can vary from sensor to sensor. Band-pass filtering can be used to minimize or eliminate such extraneous components of the acquired data, as known to those skilled in the art. Illustratively, in a fluid flow measuring apparatus in accordance with the apparatus shown in FIG. 2, for use in measuring the fluid flow associated with intentionally directed human breath (see discussion below), frequencies less than about 0.2 Hz and greater than about 5 Hz were filtered from the acquired data.

The acquired data is processed to yield information regarding the fluid flow. For example, a set of temporally proximate data from different sensors can be combined to produce one or more vectors indicating the velocity and/or acceleration of the fluid at a particular point in time. The magnitude (i.e., flow rate), orientation (i.e., flow direction) and location of each such vector can be determined. Additionally, the change in such vector(s) over time can also be determined. (The latter, indicating the change in magnitude and direction of fluid flow velocity and acceleration over time, can be used, for example, as an indication of the degree of turbulence of the fluid flow.)

Figure 4:
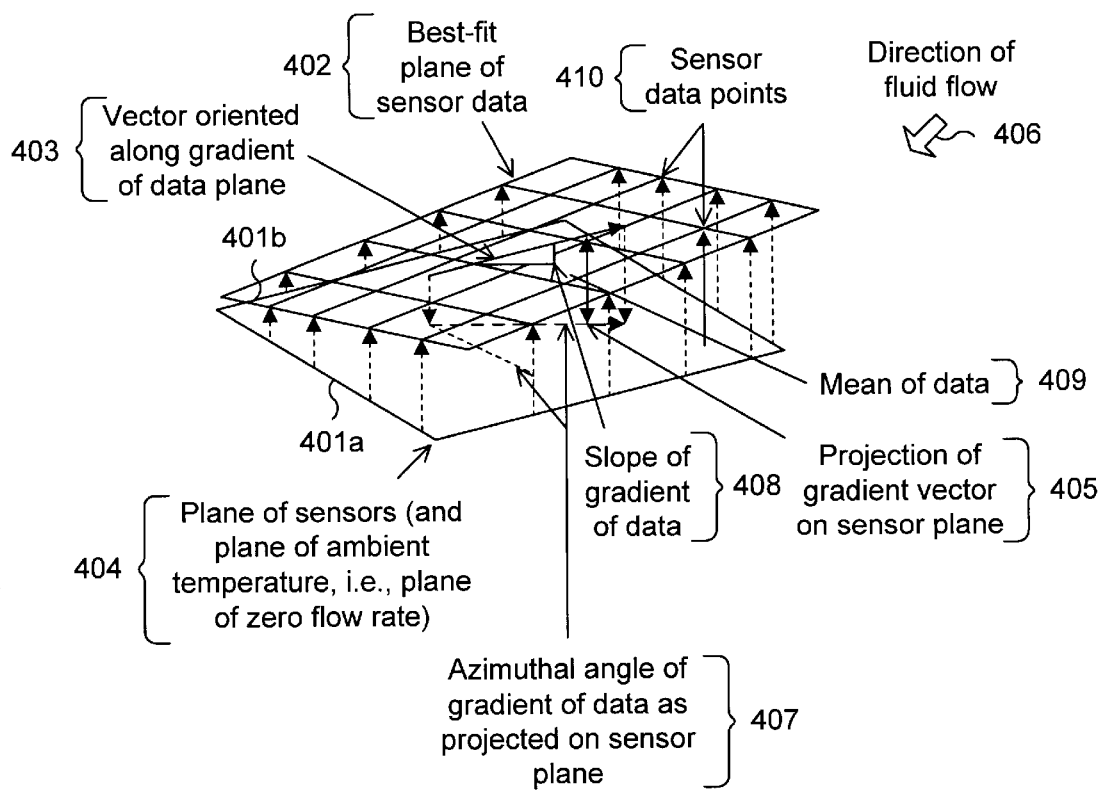
FIG. 4 illustrates one way of analyzing a set of data obtained by a fluid flow measuring apparatus in accordance with the invention.

FIG. 4 illustrates one way of analyzing a set of data obtained from an array of sensors as shown in FIG. 1. The sensor data (i.e., difference in temperature from ambient temperature, which corresponds to the magnitude of the fluid velocity) is indicated generally by the numeral 410. The sensor data is projected along a first axis (e.g., axis 103a in FIG. 1, axis 401a in FIG. 4) of the array (i.e., data that appears to be at the same location when viewed perpendicular to the axis, but is spaced apart in a direction perpendicular to the axis, is considered to be at the same location along that axis) and a curve fit is, determined for the data along that axis. The sensor data is also projected along a second axis (e.g., axis 103b in FIG. 1, axis 401b in FIG. 4) of the array perpendicular to the first axis and a curve fit is determined for the data along that axis. The curve fits can be determined using any appropriate method, such as, for example, the least-squares method. In one embodiment, a first order (linear) curve fit is determined. The two linear curve fits, one along each axis, are combined to produce a plane (plane 402 in FIG. 4). The gradient (or tilt) of the plane 402 with respect to the plane of the sensor array (plane 404 in FIG. 4) can be represented by a vector (vector 403 in FIG. 4). (In FIG. 4, the plane 404 has a dual meaning: the plane 404 represents the location and orientation of the sensor array, and also represents the magnitude of the ambient temperature within the sensor array, i.e., zero fluid velocity.) The angular orientation (angle 407 in FIG. 4) of the projection 405 of the vector 403 on the sensor array plane 404 represents the direction of the fluid flow (indicated by the arrow 406 in FIG. 4). The slope (indicated by the numeral 408 in FIG. 4) of the vector 403 indicates the change in temperature (i.e., the decrease in fluid velocity) across the sensor array. The mean temperature (indicated by the numeral 409 in FIG. 4) indicates the average fluid velocity across the sensor array.

Thus, as shown in FIG. 3, the following information has been ascertained regarding the fluid flow across the sensor array: the average fluid velocity, the direction of the fluid flow, and the change in fluid velocity across the sensor array. (Other information can be determined from successive sets of sensor data, as shown in FIG. 4, such as, for example, fluid acceleration.)

In accordance with the invention, fluid flow is measured in the vicinity of an animate object and used, together with knowledge of the characteristics of the animate object and, if relevant, one or more objects in the vicinity of the animate object to determine an intention of, or an effect produced by, the animate object. This can enable the fluid flow measurements to be used to effect an interface between the animate object and another object. In particular, it is anticipated that the invention will enable a new type of control to be used by people in their interaction with a large variety of devices.

For example, breath can be used as a means of conveying control instructions, intentionally or unintentionally. A fluid flow measuring apparatus as described above can be positioned proximate to a person's mouth and used to measure the air flow resultant from the person's breathing. The measurement of the air flow can be used in controlling a device, as illustrated below.

Breath measurement can be used, for example, to augment a voice control system. A fluid flow measuring apparatus in accordance with the invention can be mounted on a microphone of the voice control system. The voice control can be modified or conditioned upon the measurement of breathing of a speaker using the voice control system. For example, such an augmented voice control system could be implemented so that a detected sound is not recognized as a voice unless a flow rate of minimum magnitude is measured in the vicinity of the speaker's mouth, thus reducing the incidence of unintended control actions resultant from the detection by the voice control system of sounds other than the speaker's voice (e.g., background noise or another speaker's voice). Or, for example, by monitoring the state of, and changes in, the measured fluid flow in the vicinity of the speaker's mouth, information regarding position (location and/or orientation) and movement of the speaker's head can be ascertained and used to infer, for example, the speaker's focus of attention, such inference then being used to modify or initiate control action(s). The foregoing are examples of the use of breath measurement as a control mechanism where the breather does not intentionally regulate breathing to effect control.

Breath measurement can also be used to effect intentional control by the breather. Generally, a "breathing language" can be established, such that the strength (e.g., velocity and/or acceleration) and direction of breathing can denote different instructions regarding control of a device. Such an application of the invention can enable hands-free control of a variety of devices.

Figure 5:
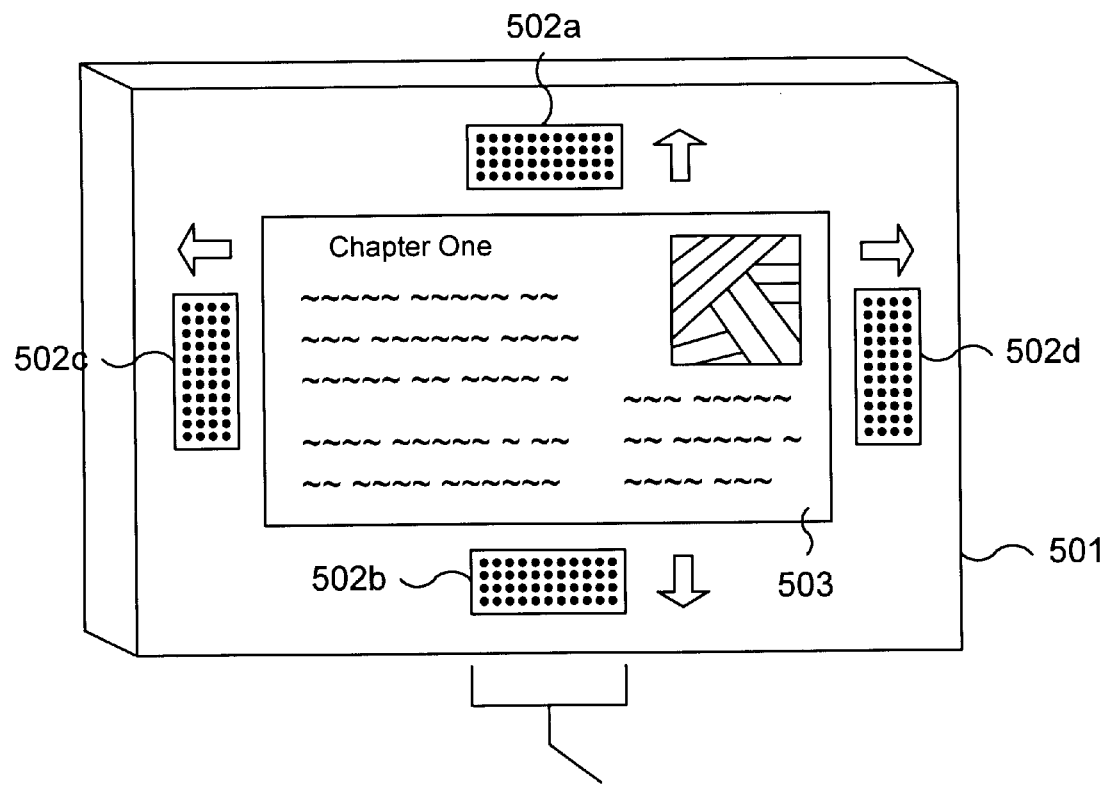
FIG. 5 is a perspective view of a display device including an air flow sensing apparatus in accordance with the invention, illustrating an exemplary application of the invention.

FIG. 5 is a perspective view of a display device 501 including an air flow sensing apparatus in accordance with the invention, illustrating an exemplary application of the invention of this type. The display device 501 includes four sensor arrays 502a, 502b, 502c and 502d. By appropriately breathing on one or more of the sensor arrays 502a, 502b, 502c and 502d, a viewer can effect desired control of the display 503. For example, as indicated by the arrows adjacent to the sensor arrays 502a, 502b, 502c and 502d, breathing on the sensor array 502a can cause the display to scroll up, breathing on the sensor array 502b can cause the display to scroll down, breathing on the sensor array 502c can cause the display to scroll to the left, and breathing on the sensor array 502d can cause the display to scroll to the right. The speed with which the display scrolls can be controlled, for example, in accordance with the strength of the breathing (e.g., stronger breathing causes the display to scroll faster). Coarse cursor control can be effected by, for example, a sweeping movement of steady breath on sensor array 502a, 502b, 502c and/or 502d, while fine cursor control can be effected by, for example, short, delicate breaths directed at a particular point on a sensor array 502a, 502b, 502c or 502d. Mouse clicks can be effected by, for example, strong, explosive breaths directed at a particular point on the sensor. The display device 501 could have great utility for people who cannot make use of their hands to control a display device, such as certain handicapped people, or in environments in which hand contact may be discouraged, such as in hospitals.

The invention can also be used to enable or augment the use of gestures in controlling a device. A fluid flow measuring apparatus as described above can be positioned on or proximate to a person's hand or other part of the body such that the air flow in the vicinity of the hand or body part is measured. Depending upon the application, control of a device can be effected as a result of unintentional and/or intentional gestures. As with breathing measurement, a gestural language corresponding to the direction and strength of the measured flow can be used to effect particular types of control. It may also be possible to discern from the fluid flow measurements whether the body part is clothed or unclothed (and even, perhaps, the type of clothing), and produce corresponding control instructions. Such gesture detection by the invention can also be used, for example, with other types of motion sensing systems to produce a motion sensing system having increased accuracy and improved capabilities of discrimination in sensing motion.

The invention can be used generally to measure the flow of any type of fluid. However, it is anticipated that in many applications of the invention, the fluid will be air.

Various embodiments of the invention have been described. The descriptions are intended to be illustrative, not limitative. Thus, it will be apparent to one skilled in the art that certain modifications may be made to the invention as described herein without departing from the scope of the claims set out below.

We claim:

1. A method for providing an interface controlled by an animate object, comprising the steps of:
   measuring fluid flow in the vicinity of a hand of a human being; and
   determining an intention of, or an effect produced by, the animate object based upon the measured fluid flow and knowledge of one or more characteristics of the animate object, wherein gestures by the human being can be discerned from the measured fluid flow in the vicinity of the hand of the human being.

2. A method as in claim 1, further comprising the step of controlling a device in accordance with the discerned gestures.

3. A system for providing an interface controlled by an animate object, for use with a voice control system, comprising:
   means for measuring fluid flow in the vicinity of the animate object, wherein the fluid flow measuring means is positioned in the vicinity of a mouth of the animate object;
   means for determining an intention of, or an effect produced by, the animate object based upon the measured fluid flow and knowledge of one or more characteristics of the animate object, wherein the determining means further comprises means for discerning breathing by the animate object from the measured fluid flow in the vicinity of the mouth of the animate object; and
   means for modifying operation of the voice control system in accordance with one or more characteristics of the measured fluid flow.

4. A system as in claim 3, wherein:
   the means for determining an intention of, or an effect produced by, the animate object further comprises means for determining a fluid flow rate; and
   the means for modifying operation of the voice control system further comprises means for inhibiting operation of the voice control system when the fluid flow rate is less than a specified magnitude.

5. A system as in claim 3, wherein:
   the means for determining an intention of, or an effect produced by, the animate object further comprises means for discerning a position and/or movement of the mouth of the animate object; and
   the means for modifying operation of the voice control system further comprises means for modifying operation of the voice control system in accordance with a position and/or movement of the mouth of the animate object.

6. A system for providing an interface controlled by an animate object, for use with a visual display device, comprising:
   means for measuring fluid flow in the vicinity of the animate object, wherein the fluid flow measuring means is positioned in the vicinity of a mouth of the animate object;
   means for determining an intention of, or an effect produced by, the animate object based upon the measured fluid flow and knowledge of one or more characteristics of the animate object, wherein the determining means further comprises means for discerning breathing by the animate object from the measured fluid flow in the vicinity of the mouth of the animate object; and
   means for controlling a display on the visual display device in accordance with one or more characteristics of the measured fluid flow.

7. A system for providing an interface controlled by an animate object, comprising:
   means for measuring fluid flow in the vicinity of the animate object, wherein the fluid flow measuring means is positioned in the vicinity of a hand of a human being; and
   means for determining an intention of, or an effect produced by, the animate object based upon the measured fluid flow and knowledge of one or more characteristics of the animate object, wherein the determining moans further comprises means for discerning gestures by the human being from the measured fluid flow in the vicinity of the hand of the human being.

8. A system as in claim 7, further comprising means for attaching the fluid flow measuring means to the animate object.

9. A system as in claim 7, wherein the fluid flow measuring means further comprises a temperature sensor.

10. A system as in claim 9, wherein the fluid flow measuring means further comprises a semiconductor device.

11. A system as in claim 10, wherein the temperature sensor is a diode.

12. A system as in claim 7, wherein the fluid flow measuring means further comprises five or more data sensors.

13. A system as in claim 7, wherein the fluid flow measuring means further comprises multiple data sensors arranged in an array of at least two dimensions.

14. A system as in claim 7, wherein the determination of the intention or effect is further based upon knowledge of one or more characteristics of one or more objects in the vicinity of the animate object.

15. A system as in claim 7, wherein the number of data sensors is a multiple of eight.

16. A system as in claim 7, further comprising means for controlling a device in accordance with the discerned gestures.

17. A method for providing an interface controlled by an animate object, for use with a voice control system, comprising the steps of:

measuring fluid flow in the vicinity of a mouth of the animate object;

determining an intention of, or an effect produced by, the animate object based upon the measured fluid flow and knowledge of one or more characteristics of the animate object, wherein breathing by the animate object can be discerned from the measured fluid flow in the vicinity of the mouth of the animate object; and modifying operation of the voice control system in accordance with one or more characteristics of the measured fluid flow.

18. A method as in claim 17, wherein:

the step of determining an intention of, or an effect produced by, the animate object further comprises the step of determining a fluid flow rate; and the step of modifying operation of the voice control system further comprises the step of inhibiting operation of the voice control system when the fluid flow rate is less than a specified magnitude.

19. A method as in claim 17, wherein:

the step of determining an intention of, or an effect produced by, the animate object further comprises the step of discerning a position and/or movement of the mouth of the animate object; and the step of modifying operation of the voice control system further comprises the step of modifying operation of the voice control system in accordance with a position and/or movement of the mouth of the animate object.

20. A method for providing an interface controlled by an animate object, for use with a visual display device, comprising the steps of:

measuring fluid flow in the vicinity of a mouth of the animate object;

determining an intention of, or an effect produced by, the animate object based upon the measured fluid flow and knowledge of one or more characteristics of the animate object, wherein breathing by the animate object can be discerned from the measured fluid flow in the vicinity of the mouth of the animate object; and controlling a display on the visual display device in accordance with one or more characteristics of the measured fluid flow.

* * * * *